(12) United States Patent
Bradbury (10) Patent No.: US 9,254,050 B1
(45) Date of Patent: Feb. 9, 2016

(54) DETACHABLE HANGING ASSEMBLY FOR COOKWARE AND UTENSILS

(71) Applicant: Michael Sean Bradbury, Eagle, CO (US)

(72) Inventor: Michael Sean Bradbury, Eagle, CO (US)

(73) Assignee: Michael S. Bradbury, Eagle, CO (US)

( * ) Notice: Subject to any disclaimer, the term of this patent is extended or adjusted under 35 U.S.C. 154(b) by 0 days.

(21) Appl. No.: 14/324,147

(22) Filed: Jul. 4, 2014

Related U.S. Application Data (60) Provisional application No. 61/893,980, filed on Oct. 22, 2013.

(51) Int. Cl.
*A47B 81/04* (2006.01)
*A47F 5/08* (2006.01)
*A47F 7/00* (2006.01)
*A47B 77/14* (2006.01)

(52) U.S. Cl.
CPC ............... *A47F 5/0838* (2013.01); *A47B 77/14* (2013.01); *A47B 81/04* (2013.01); *A47F 7/0064* (2013.01)

(58) Field of Classification Search
CPC ...... A47B 77/14; A47B 81/04; A47B 96/063; A47B 61/003; A47B 61/02; A47J 45/02; A47J 47/16; A47J 47/20; A47F 5/0838; A47F 5/08; A47F 7/0064; A47G 25/0692
See application file for complete search history.

(56) References Cited

U.S. PATENT DOCUMENTS

| | | | |
|---|---|---|---|
| 1,256,849 A * | 2/1918 | Vaudreuil | 211/123 |
| 1,613,447 A | 1/1927 | Ellberg | |
| 1,814,692 A | 7/1931 | Harris | |
| 2,460,997 A * | 2/1949 | Myers | 211/123 |
| 2,462,321 A * | 2/1949 | Holmes | 211/123 |
| 2,757,804 A | 6/1953 | Sadwin | |
| 2,788,132 A | 5/1954 | Lewis | |
| 2,758,904 A | 8/1956 | Hansell et al. | |
| 2,987,289 A | 2/1957 | Wamsley | |
| 3,175,243 A * | 3/1965 | Weber | 16/87.4 R |
| 3,379,484 A | 4/1968 | Kling | |
| 3,627,143 A | 12/1971 | Alexander | |
| 3,664,512 A * | 5/1972 | Smith | 211/113 |
| 3,780,875 A | 12/1973 | Scholl | |
| 3,998,332 A | 12/1976 | Lambertson | |
| 4,226,394 A * | 10/1980 | Einhorn | 248/223.41 |
| 4,290,531 A | 9/1981 | Lazarus, III | |
| 2,611,492 A | 9/1982 | Watts | |
| 4,714,166 A | 12/1987 | Hann et al. | |
| 5,238,127 A | 8/1993 | Geller | |
| 5,544,387 A * | 8/1996 | Yamamoto et al. | 16/87.4 R |
| D392,130 S | 3/1998 | Wangler | |
| 6,039,191 A | 3/2000 | Purnell | |
| 6,227,387 B1 | 5/2001 | Rose | |
| 6,729,479 B2 | 5/2004 | Morgan | |

(Continued)

FOREIGN PATENT DOCUMENTS

| | | | | |
|---|---|---|---|---|
| CA | 1235673 A1 * | 5/1988 | | |
| FR | 2580536 A1 * | 10/1986 | | A47J 47/16 |

*Primary Examiner* — Stanton L Krycinski (57) ABSTRACT

An improved method of storing and retrieving cookware and utensils utilizing an assembly that can be attached to a shelf of a kitchen cabinet without the use of tools. The assembly incorporates Cookware hanger assemblies and Cookware guard whose positions are adjustable along the length of the assembly. Cookware can be stored onto the assembly in a hanging position. The Teflon coating of the cookware is protected from damage with the use of Cookware guard assemblies.

6 Claims, 7 Drawing Sheets

(56) References Cited

U.S. PATENT DOCUMENTS

| | | |
|---|---|---|
| 6,808,150 B1 * | 10/2004 | Roetenberg .................. 248/317 |
| 6,976,595 B1 | 12/2005 | Geller |
| 7,152,838 B2 * | 12/2006 | Taulbee ....................... 248/307 |
| 7,766,290 B1 * | 8/2010 | Bradbury ................... 248/200.1 |
| 8,074,812 B1 * | 12/2011 | Bradbury ..................... 211/13.1 |
| 8,132,768 B2 * | 3/2012 | Fernandez et al. ............ 248/254 |
| 8,936,225 B2 * | 1/2015 | Bradbury ..................... 248/339 |
| 2008/0302745 A1 * | 12/2008 | Groll et al. ................... 211/124 |

* cited by examiner

DETACHABLE HANGING ASSEMBLY FOR COOKWARE AND UTENSILS

FEDERALLY SPONSORED RESEARCH

Not Applicable

SEQUENCE LISTING OR PROGRAM

Not Applicable

CROSS-REFERENCE TO RELATED APPLICATION

This application is entitled to the benefit of Provisional Patent Application Ser. No. 61/893,980, filed 2013, Oct. 22 by the present inventor, which is incorporated by reference.

FIELD OF INVENTION

This invention relates to cookware hangers, specifically to be installed with the confines of a kitchen cabinet.

BACKGROUND OF INVENTION

Kitchen cabinet cookware and utensil storage has always been awkward, inefficient, and cumbersome. The problem of storing several different sized and shaped cookware and utensils inside cabinets has made their storage nearly impossible to do in a manner that is satisfactory for anyone who desires a neat and efficient kitchen. The problem of cookware storage has been compounded over the recent decades by the introduction and ubiquitous adaptation of non-stick cookware. This style of cookware utilizes Teflon as a non-stick surface between the cookware's metal surface and the food being cooked allowing the food to be easily removed from the cookware and ease it's cleaning. Teflon used in this manner has one major draw back; it is fragile and susceptible to damage from contact with metal utensils or the metal from other pots and pans. Teflon coated cookware also has exposed metal bottoms, sides and handles which when stacked upon each other inside of cabinets causes the damaging contact that can cause the Teflon to peal from the cooking surface thus eliminating Teflon as an advantage to the cookware.

One method of safe guarding the Teflon coating of non-stick cookware would be to not stacking the cookware in a manner that would allow metal to Teflon contact. This method of in cabinet storage would be an inefficient use of cabinet space, as each piece of cookware would need its own shelf area on the cabinet's shelves. Another alternative would be the use of a hanging cookware holder which would be mounted from the ceiling and hang in the kitchen exposed in the kitchen's open area. This method of cookware storage would leave the cookware exposed as well as consuming space in the kitchen that could be used for other purposes when the cookware is not needed. Cookware hanging in the kitchen and can be also an unsightly eyesore.

There have been several attempts in the past to help lesson the problem of kitchen cookware and utensil cabinet storage but none have so far been satisfactory for conveniently and neatly store these items.

PRIOR ART

There have been many attempts in the past to solve the problem of cookware and utensil storage in kitchens, and these attempts can be categorized into several types of devices invented.

The most popular device utilized for cookware and utensil storage is the hanging storage rack. These types of racks are most popular in larger kitchens where they can be hung in the open space of the kitchen thus taking up useful kitchen workspace. The cookware is also exposed creating an eyesore for most who desire a neat and clean kitchen. Most of these racks have been issued a Design patent since these racks have little or no unique features to produce unexpected results to warrant a Utility patent.

In 1926 Ellberg was issued U.S. Pat. No. 1,613,447 which discuses a hanging device to have a plurality of suspension hooks suitable mounted to be relatively adjustable. Unfortunately Ellberg's invention relies on mounting brackets and strips for its application and the assemblies overall length is not adjustable thus restricting its application for the end user.

In 1931 Harris was issued U.S. Pat. No. 1,814,692 for a wall mounted telescoping utensil rack. Harris describes his rack as "comprising of telescopically associated sections supported a distance away from a wall, so that utensils or utensil covers may be arranged in the space between the wall and body of the rack". The required mounting surface Harris describes imposes a great limitation upon the rack, as it requires a sizable unobstructed vertical plane that may be difficult to accommodate in any kitchen. The rack's ability to hang large items is also limited to the length of the screw hooks as the hooks are what secures the telescoping members and away from the vertical plane creating the hanging space available.

In 1948 Watts was issued U.S. Pat. No. 2,611,492 for his hanger in strip form. Unfortunately Watt's invention only allows for pre-positioned hanger placements via sockets molded into the strip. Therefore Watts's hooks are stationary when the ball end is in the socket and are not moveable along the strip section unless the ball end is lifted vertically out of the socket. This is a clumsy arrangement in the least for changing the position of any hook of the hanger especially if any article is hanging from the hook. Depending on the article hanging from the hook the article may need to be removed in order to lift the ball end of the hook out of the socket before the move the hook could be moved to a new position.

U.S. Pat. No. 2,788,132 issued May 17, 1954 to Lewis describes an adjustable hanger for storm windows but also has other hanging applications. Lewis's hangers are individually adjustable in position along the assembly but the hooks cannot rotate or pivot to accommodate different hanging positions or ease in its use. The hooks themselves are described as flat and rectangular shaped which severely limits the types of objects that can be hung from the hooks.

U.S. Pat. No. 2,757,804 issued to Sadwin in 1956 details a new and useful improvement in clothes hanger assemblies for closets and the like. The patent is described as "a clothes hanger assembly which can readily be installed on the underside of a closet shelf or the like for slid ably supporting a plurality of clothes hangers" as well as "a clothes hanger assembly for supporting clothes or the like which will occupy but a small space in a closet". Unfortunately Sadwins invention does not allow the hooks of his brackets to rotate and pivot. Thus Sadwin's brackets are greatly restricted in respect to the hooks capability to accommodate the needs of the user to hang items from brackets if more functionality is required than merely altering the position of the brackets along the assembly.

Sadwin also describes about his invention an elongated tubular outer box-like section and an elongated tubular inner box-like section telescopically and slid ably arranged in the outer section. Sadwin's assembly is therefore extensible in length through the ability of telescopically sliding the inner section inside of the outer section. For this arrangement to be achieved the trackways of the outer section and track ways of the inner section would not create a single plane that would allow rollers of the brackets to easily travel the length of the assembly without the obstruction of the inner section's outer wall.

In 1961 Wamsley was issued U.S. Pat. No. 2,987,289 for his hangers for suspending articles. Wamsley's invention is a hanger in which his hooks are capable of being in two positions, in a lowered resting position from where it is "easily introduced into a hooked or looped handle" of the hanging article to a raised position when the weight of the article "moves the suspending member into the second position". This hanger position change action is intended for the suspended member to be "held against accidental displacement there from". Wamsley's hanger does not allow hooks to freely move along the hanger except along predetermined positions and only by removing and reintroducing hooks to the hanger. Wamsley's hangers are also unable to pivot except for the two positions mentioned above as well as completely lacking the ability to rotate. Wamsley makes no mention of his hanger being adjustable in length and thus its overall size would remain static and inconvenient for the user.

Alexander was issued U.S. Pat. No. 3,627,143 in 1971 for his invention specifically intended for hanging clothing. Alexander's hangers can only be inserted into a tube through a slot and unfortunately cannot travel the length of the tube, as the bar would fall through the slot when it comes to the slots position. Another of Alexander's embodiments is a clothes hanger of U shaped member with "two separate spaced elongated longitudinally extending slot portions". Thus again Alexander's hangers cannot freely travel the length of his clothes hanger, as there is an interruption between the slot portions. Alexander also describes "the bottom surface is provided with a plurality of transversely extending hanger positioning means for maintaining the bars" and "extending transversely with respect to the longitudinally extending slot portions". Alexander's hangers have predetermined positions along the slots thus his hangers not only cannot travel the length of the hanger but also cannot travel freely along the separate slots as the hangers travel will be interrupted by the positioning means.

U.S. Pat. No. 3,780,875 issued December 1973 to Scholl details a suspended hanger for pots and pans from an overhead surface. The device utilizes a base member and a column and a hanger assembly secured to the lower end of the column that rotates around the column. The hanger would be unable to fit inside of a conventional kitchen cabinet, as it would require a large vertically symmetric area for operating the rotational hanger feature of the device. The individual hangers cannot be independently positioned in relation to the other hangers therefore the entire device must be rotated in order to reposition the cookware.

U.S. Pat. No. 3,998,332 was issued to Lambertson on Dec. 21, 1976 that details a horizontal rack member supporting hooks. Lambertson's patent unfortunately does not allow for rotating and pivoting hooks as well as the hooks positions were not intended to be adjusted along the length of the rack while cookware is in use.

U.S. Pat. No. 4,290,531 issued Sep. 22, 1981 to Lazarus details a device for holding cooking pots and lids. The device does hang pots and lids but fails to have adjustable or moveable hooks and the hooks must work in concert with lid holders to suspend both pots and lids.

U.S. Pat. No. 4,714,166 issued Dec. 22, 1987 to Hann and Fuller details a supporting rack for cooking utensils. The rack has a framed structure that supports several hooks along its framed perimeter. The rack was intended to hang from the kitchen ceiling or from another structure providing enough structural strength and area to hang the rack and the cookware hung by it. The hooks are only able to slide along the framed perimeter and are unable to pivot and rotate. This device was envisioned for use in an open area of the kitchen and not inside of a closed structure like a cabinet.

U.S. Pat. No. 5,238,127 issued Aug. 24, 1993 to Geller details a pan holder that is attached to the ceiling, stores pans in an overhead position near the end of a flexible cantilever beam which can be pulled down to allow easy removal of the pots and pans. The holder does not however allow for adjustable hooks whereby the hooks can be moved into different positions along the holder as well as not being able to pivot and rotate. The holder is to be used in the open kitchen area and not in a closed area such as a cabinet.

U.S. Pat. No. 6,039,191 issued Jul. 2, 1997 to Purnell also details a hanging rack for being suspended from the ceiling in the open kitchen area. The structure is complicated in construction that results in a large, heavy, and expensive device for hanging cookware and utensils. The devices utilizes a plurality of bars from which it is to be hung from and hooks which are able to slide along the bars but unable to pivot and rotate.

Wangler was issued design patent Des. 392,130 in 1998 for a set of shelves with sliding tracks for hanging ornaments. Wangler's "sliding tract" is a part of the shelf itself, thus the tract cannot be added or removed from the shelf at any time and also would be a permanent fixture of the shelf and cabinet. This feature also limits the tract as it cannot be altered in length, as it is a part of the shelf as well as the limitation of having to remove the shelves in order to add or subtract the number of hooks. Wangler makes no mention of the material from which the tracts would be constructed from other than the material of the shelves themselves. This would also be a great limitation for her inventions as cabinet shelves are generally made from particleboard or wood and thus greatly reduce the weight bearing properties of the tracts.

Another method of cookware storage incorporates the use of pull out cabinet racks. U.S. Pat. No. 3,379,484 issued April 1968 to Kilng details a pivoted rack for utensils and the like, which incorporates sheets of pegboard that can be swung outside of the cabinet storage space. Unfortunately this rack would not be functional in a cabinet that had a divider between the cabinet doors, and the hooks are only adjustable in which the positions the user had placed them prior to hanging utensils. The hanger is also cumbersome in construction and installation and is not adjustable in size therefore could not universally fit different sized cabinets.

U.S. Pat. No. 2,784,904 issued May 28, 1954 to Hansell also describes a pull out pan rack but unfortunately the product suffers from many of the same shortcomings as Kling's patent. Hansell's rack would slide in and out of the cabinet space, the rack itself constructed from pegboard or the like. The hanger is cumbersome in construction and installation and is not adjustable in size therefore could not universally fit different sized cabinets. The hooks are also only adjustable in which the positions the user had placed them prior to hanging utensils.

Another attempt to solve the kitchen cookware and utensil storage problem is the introduction of pull out hanging racks. U.S. Pat. No. 6,227,387 issued May 8, 2001 to Rose details an apparatus for supporting utensils. Rose's design allows for the rack to be pulled out of the cabinet from it's supporting base, which would be mounted inside of a cabinet. Rose's design unfortunately does not allow for adjustable hooks. Rose's hooks are fixed to one piece thus not allowing for independent positioning of the hooks along the length of the assembly as well as his hooks cannot rotate and pivot. Rose's design would make multiple cookware placement cumbersome since different pieces of cookware have different dimensions and would require different hook interval positions for each hanging piece of cookware. Rose's sound accentuating devices would also make hanging and retrieving cookware less convenient since they also have static positions along the assembly and cannot be adjusted to accommodate cookware of differing dimensions or be positioned away from cookware that is being retrieved or stored. Thus Rose's sound attenuating devices become an obstacle for the user to retrieve and store cookware on his assembly. Rose's sound attenuating devices also cannot offer a customized fit to cookware of varying dimensions thus not allowing for smaller sized cookware to fit within larger sized cookware. This is an unfortunate design over site which causes Rose's invention to not fully utilize the space saving feature of vertical nesting of cookware.

Another pull out hanging rack was patented U.S. Pat. No. 6,976,595 by Geller on Dec. 20, 2005. Geller's patent unfortunately suffers from some of the same shortcomings as Rose's patent in that the hooks remain stationary and therefore does not allow the assembly to fully accommodate the user's need in storing and retrieving cookware. Geller's and Rose's assemblies would also require a cabinet space which is deep in length from front to back to accommodate a pull out rack of this nature, something rarely seen in any kitchen as most cabinets are wider than they are long.

Another method of storing cookware in a cabinet is the use of wire storage racks inside of the cabinet. U.S. Pat. No. 6,729,479 issued to Morgan on May 4, 2004 details a wire storage rack for pots and pans that can be mounted on a base. This style of storage device is unfortunately inconvenient in use since it requires the user to navigate the wires with cookware in it's storage in order to store the piece of cookware in hand. The device also uses the base of the cabinet instead of being able to hang from an overhead plane thus consuming the base of the cabinet's storage area while not offering more storage volume than a hanging device.

U.S. Pat. Nos. 7,104,409, 7,121,413, and 7,007,808 all detail wire storage racks of much the same configuration as Morgan's patent, and all unfortunately all suffer from the same short comings as Morgan's patent as they are all complicated in construction and use.

OBJECTS AND ADVANTAGES

The advantages of the detachable cabinet kitchen cookware hanger are as follows:
(a) to provide a more efficient method to utilize the storage volume inside of a kitchen cabinet for cookware and utensil storage;
(b) to provide a more efficient and convenient method of cookware and utensil storage and retrieval during kitchen operation;
(c) to provide an improved method of cookware and utensil organization;
(d) to provide a cookware storage solution for fragile Teflon coated cookware from the damage that could occur if the cookware was to be stored in with conventional methods;
(e) to provide a hanging assembly for cookware with guards to protect the cookware from damage caused by other cookware;
(f) to provide and adjustable hanger assembly to accommodate varying sizes of storage areas in which the assemblies would be installed;
(g) to provide a cookware hanging assembly that is easy to install and can be installed without the use of tools or specialized skills.
(h) Another advantage for one embodiment is the ability to utilize the cabinet shelf the cookware hanger is attached to for additional cabinet storage for more cookware, dinnerware or utensils;
(i) Further objects and advantages of my invention will become apparent from a consideration of the drawings and ensuing description.

SUMMARY

The Detachable Hanging Assembly for Cookware and Utensils is an assembly for hanging implements with accommodating appendages with the confines of a kitchen cabinet. The Assembly comprising of a rod that is attached to two opposing Assembly support brackets. The shelf and the Assembly are both supported by the shelf brackets that are native to the cabinet. Cookware Hanger Assemblies are coupled to the Hanger Assembly Rod and have positions that are adjustable along length of the Rod. Hooks hang from hanger assemblies in a downward vertical position that can rotate and pivot about their vertical axis, cookware and utensils can be attached to the hooks. Hanging guards are placed intermittently between Hanger Assemblies and separate the hanging cookware.

REFERENCE NUMERALS

50. Cabinet shelf
51. Cabinet wall
52. Shelf supports
54. Assembly support bracket
56. Detachable hanging assembly for cookware
58. Bushing
60. Cookware hanger assembly
62. Adjusting screw
64. Hanger extension
66. Rotating pivot
68. Hanger slider
70. Hanger hook
72. Adjustment screw stop
74. Shelf bracket
76. Bracket rod cradle
78. Hanger assembly rod 79. Rod cradle support
80. Bracket backing plate
82. Cookware
84. Cookware guard assembly
86. Guard shoulder
88. Guard strand
90. Guard strand condenser
92. Guard shaft
94. Guard hanger assembly attachment
96. Guard strand weight
98. Guard rotating pivot
100. Guard slider
102. Cabinet
104. Cabinet door

DESCRIPTION—PREFERRED EMBODIMENT
FIGS. 1-8

Referring to FIGS. 1-8 for the following description of the Detachable Hanging Assembly for Cookware and Utensils. A kitchen Cabinet shelf (50) is in place inside of a kitchen Cabinet (102) resting on its original shelf supports (52). The Hanger Assembly Rod (78) is a hollow rod made from a rigid and durable material such as steel and has a Bushing (58) attached to the inside said Rod (78) at one end. The Bushing (58) is compatible with and connected to Adjusting screw (62) such that said Screw (62) can be adjusted into or out from said Rod (78) by rotating either said Rod (78) or said Screw (62) thus allowing for a variable overall length of the combination of said Rod (78) said Screw (62). Adjusting screw (62) and the opposite end of Rod (78) are both able to fit inside Bracket rod cradles (76) of Assembly support brackets (54) that are positioned against cabinet wall (51). Adjusting screw stop (72) has internal threads that are compatible to Adjusting screw (62) threads such that Screw stop (72) can be positioned along the length of Screw (62) by rotating Stop (72). Assembly support brackets (54) have Shelf brackets (74) each having a portion that occupies a volume between Cabinet walls (51) and Cabinet shelf ends (50) and each Bracket (74) has a portion in contact with and on the top surface of the Shelf (50). Cabinet shelves (50) weight is supported by Shelf supports (52) that are attached into receiving voids into the Cabinet wall (51). A Cookware hanger assembly (60) has a Hanger slider (68) that is slidingly coupled to and has a circumference that completely encircles the circumference of the Hanger assembly rod (78). The Hanger slider (68) contains and supports a Rotating pivot (66) that is able to pivot and rotate a predetermined number of degrees from its vertical axis. The upper portion of the Hanger hook (70) is attached to the Rotating pivot (66) allowing the hook portion to hang in a downward pendant position and is configured to hang accommodating articles in a downward pendant position Rotating Pivot (66) allows the Hanger Hook (70) to rotate and pivot a predetermined number of degrees from the Hooks (70) vertical axis.

Figure 9:
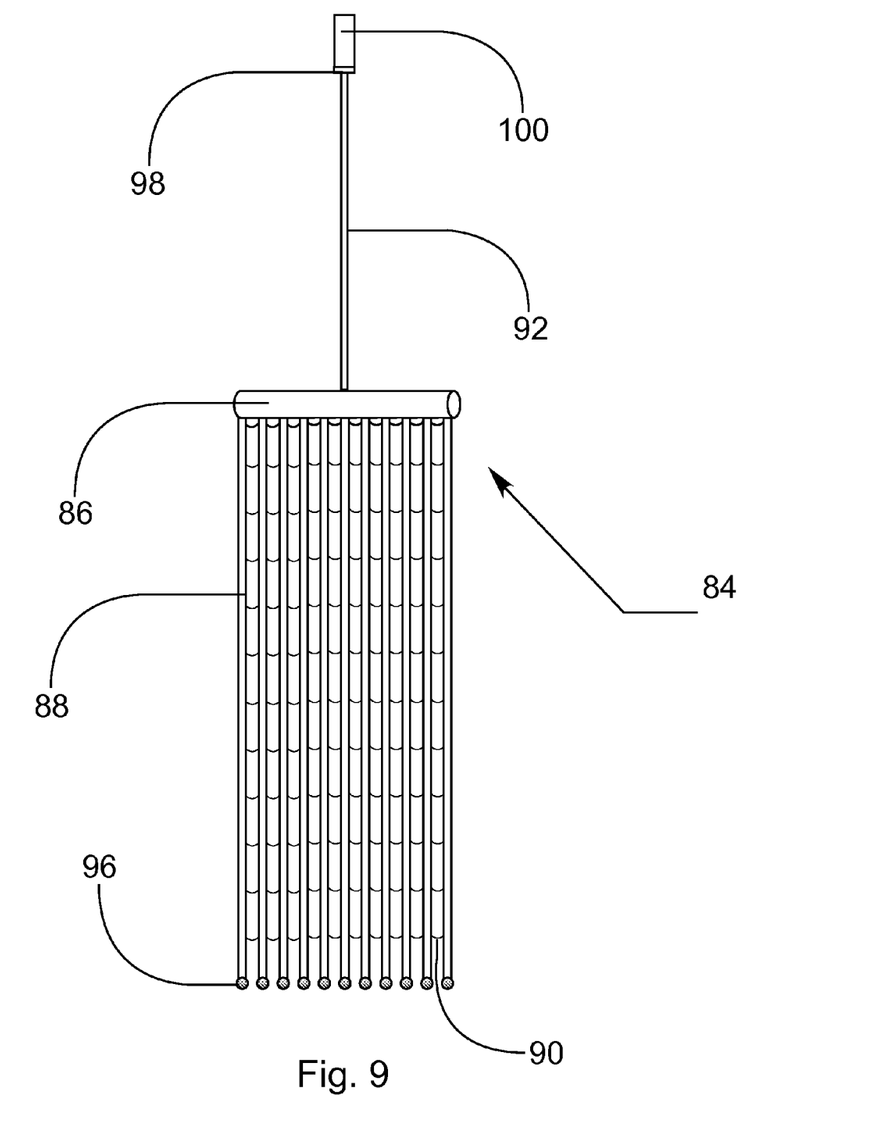
FIG. 9 is a side view of a Cookware Guard Assembly.

Guard slider (100), Guard rotating pivot (98), Guard shaft (92), Guard shoulder (86), Guard strand (88), Guard strand condenser (90), and Guard strand weight (96) are assembled as one unit as the Cookware guard assembly (84). Guard support (85), Guard (86), and Guard weight (87) are assembled as one unit as a Hanging Guard Assembly (84). Cookware guard assemblies (84) has a Guard slider (100) that is slidingly coupled to and has a circumference that completely encircles the circumference of the Hanger assembly rod (78). Rotating guard pivot (98) allows the Guard shaft (92), to rotate and pivot a predetermined number of degrees from the Pivots (98) vertical axis.

OPERATION—PREFERRED EMBODIMENT
FIGS. 1-8

The Detachable hanging assembly for cookware (56) is designed to be able to be installed inside of a kitchen cabinet (102) onto a Cabinet shelf (50) that is supported by Shelf supports (52). Assembly support bracket (54) are mounted onto opposing sides the Shelf (50) that are both in contact with the Cabinet walls (51). Shelf brackets (74) of Assembly support brackets (54) fit onto the Cabinet shelf (50) such that Bracket backing plate (80) is between the Shelf (50) and the Cabinet wall (51). The weight of the Assembly (56) and the Cookware (82) hanging from said Assembly (50) is supported by the Shelf (50) that is supported by Shelf supports (52).

Figure 1:
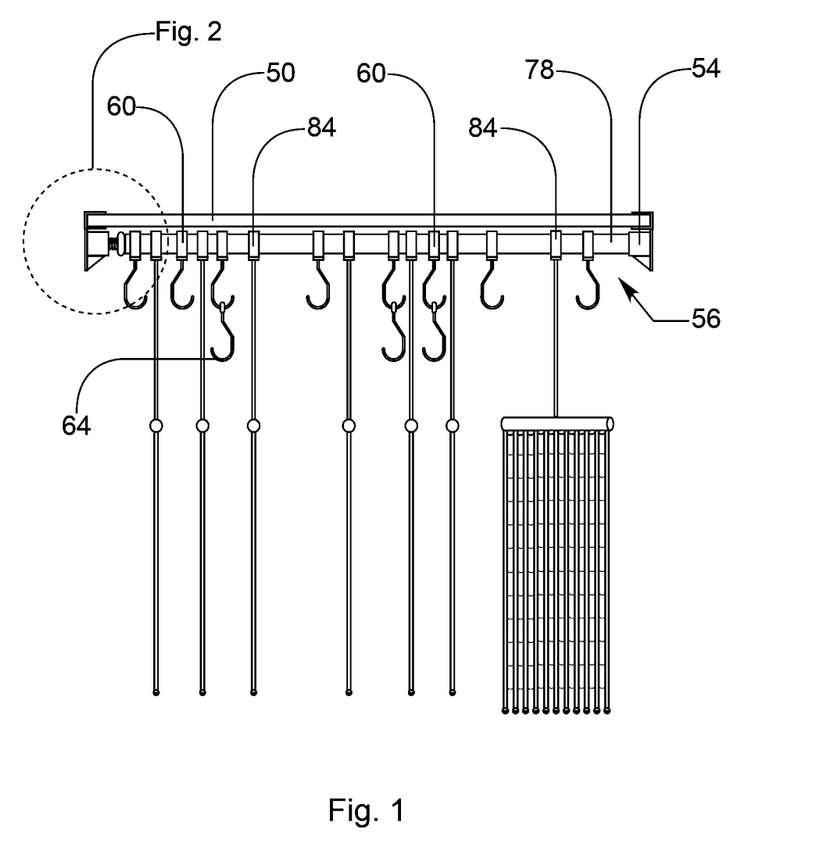
FIG. 1 is a front view of the Detachable Hanging Assembly for Cookware and Utensils with Cookware Guards.
Figure 2:
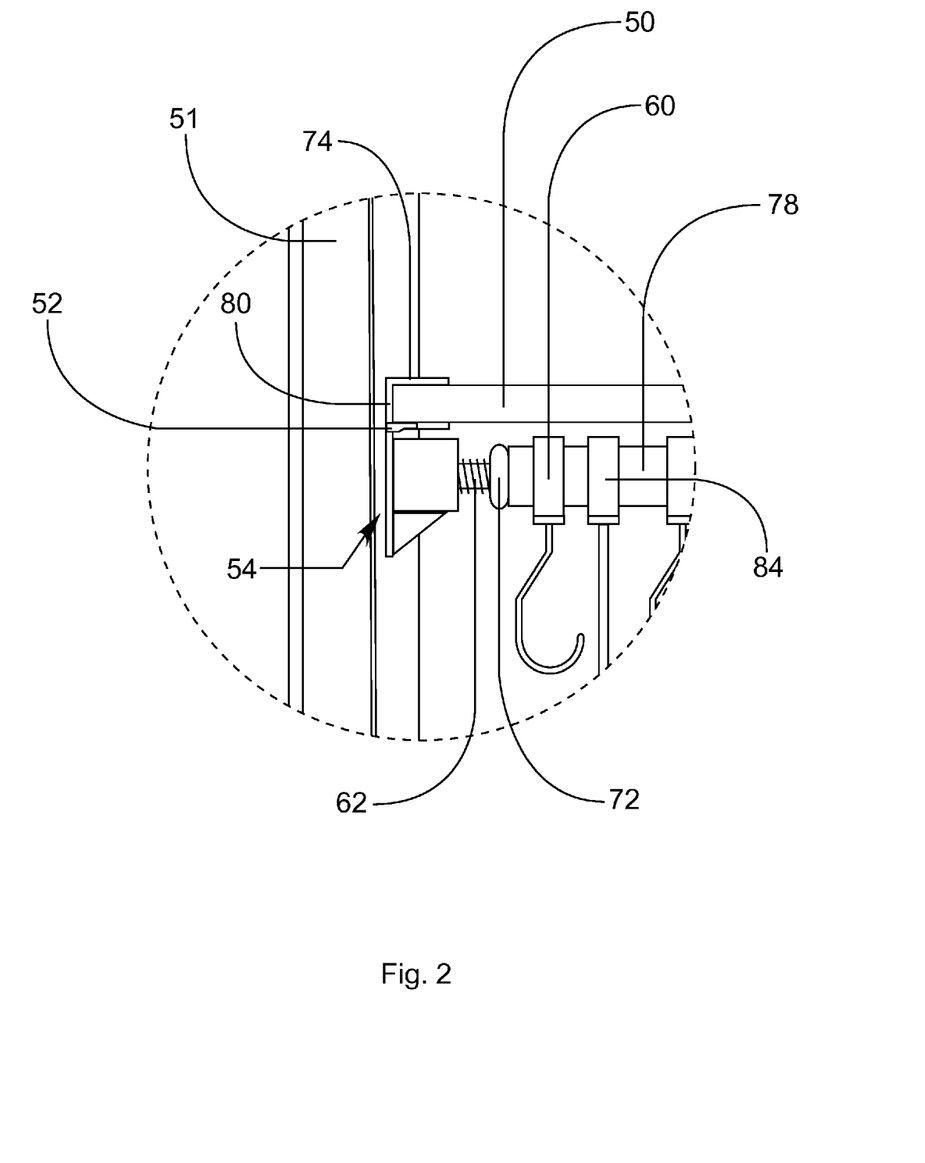
FIG. 2 is an enlargement from FIG. 1 detailing the Assembly support bracket.
Figure 3:
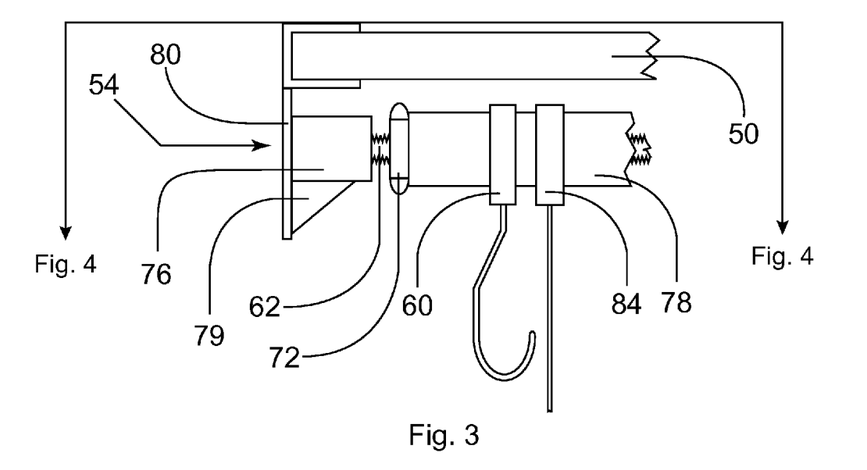
FIG. 3 is a side view of the Assembly Support Bracket and shelf.
Figure 4:
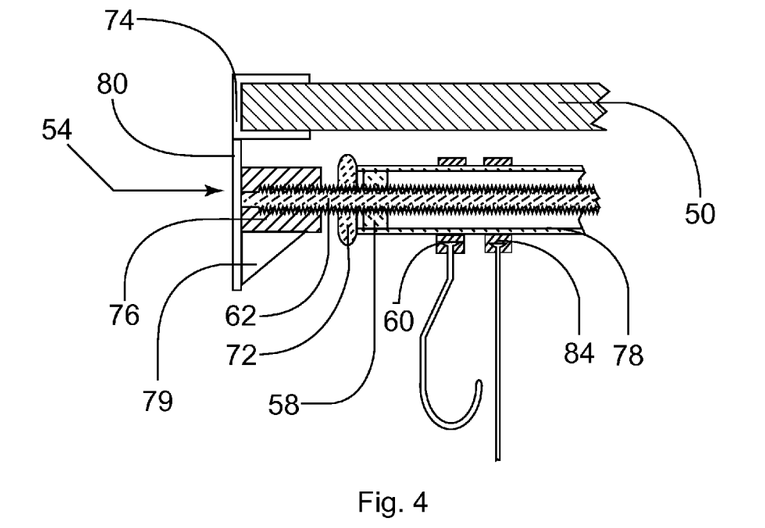
FIG. 4 is a sectional view from FIG. 3.
Figure 5:
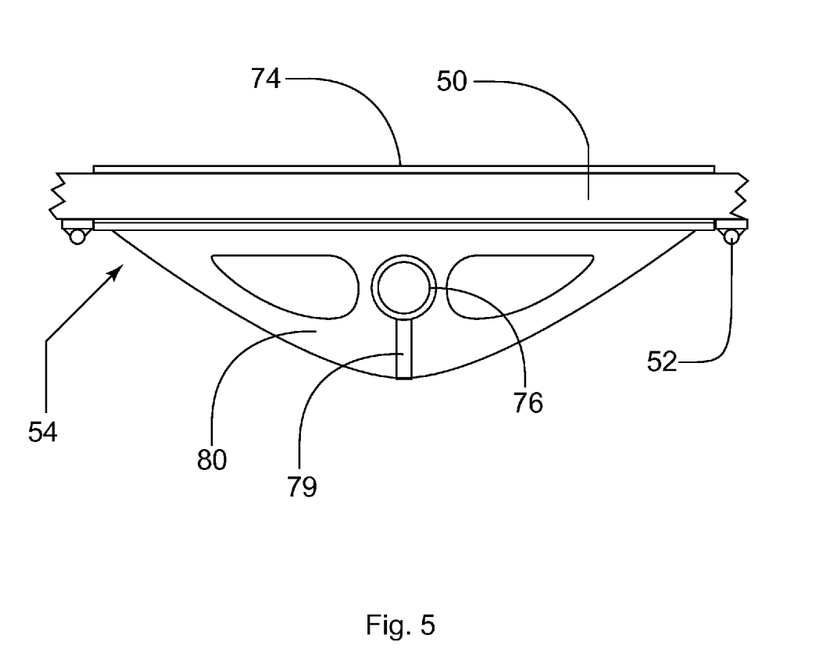
FIG. 5 is a front view of the Assembly Support Bracket and shelf.
Figure 6:
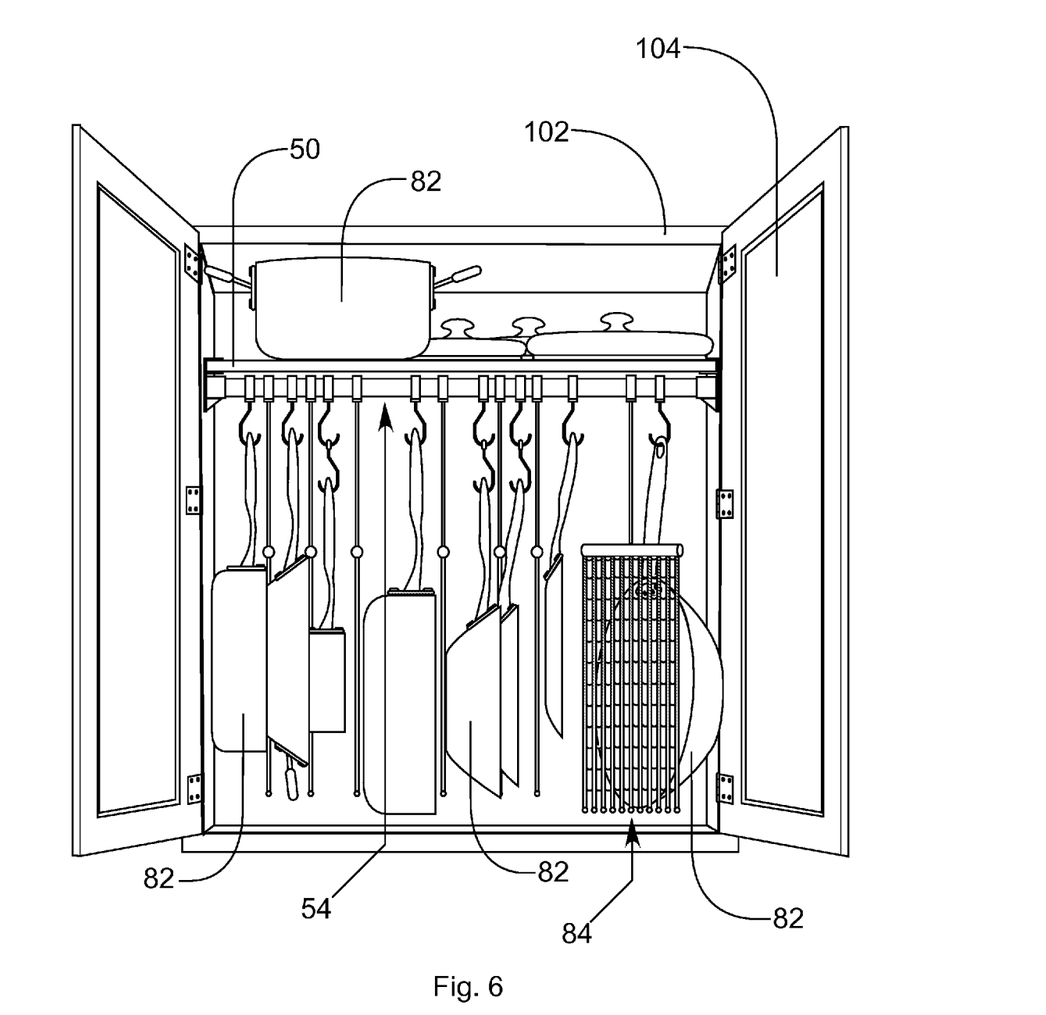
FIG. 6 is a front view of the Detachable Hanging Assembly inside the confines of a kitchen cabinet.

Detachable hanging assembly for cookware (56) may be adjustable in length to accommodate different sized cabinets by rotating the Hanger assembly rod (78) and the connected Bushing (58) clockwise or counter clockwise relative to the Adjusting screw (62). Adjusting screw stop (72) is joined to the Adjustment screw (62) and when in contact with the Hanger assembly rod (78) prevents the Rod (78) and Bushing (58) from rotating and preventing further length adjustment of the Hanger assembly rod (78) and the Adjusting screw (62) combined length.

Figure 7:
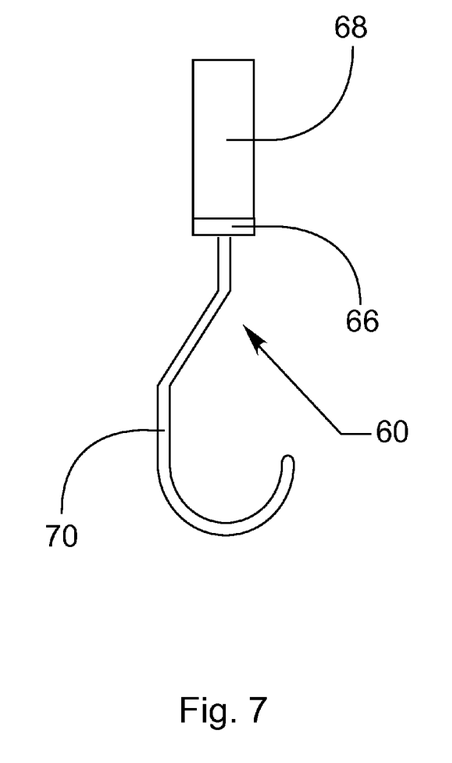
FIG. 7 is a side view of a Cookware Hanger Assembly.
Figure 8:
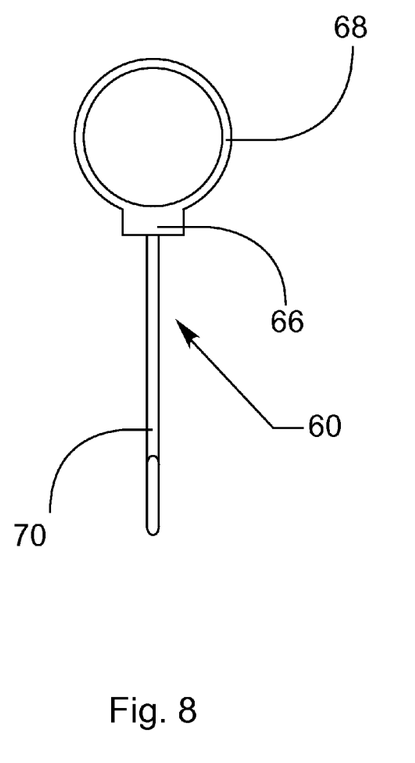
FIG. 8 is a side view rotated 90 degrees from FIG. 7 of a Cookware Hanger Assembly.

Hanger slider (68), Rotating pivot (66), and Hanger hook (70) are all assembled as one unit as a Cookware hanger assembly (60). The Hanger assemblies (60) are coupled to the Hanger assembly rod (78) by the Hanger slider (68) and are capable of sliding freely along the Rod (78). Rotating pivot (66) allows the Hanger hook (70) to rotate and pivot a predetermined number of degrees from the Hooks (70) vertical axis. Hanger hooks (70) allows for any Cookware (82) with hooks or accommodating appendages to hang from The Assemblies (60). Cookware (82) hanging from the assemblies (60) can be moved along the length of the Hanger assembly rod (78). Cookware (82) can also be rotated as well as pivot around the Hanger hooks (70) vertical axis through the Pivot (66). The ability to move Cookware (82) along the Hanger assembly rod (78) as well as being able to rotate and pivot will allow the user to better manage the storage volume inside the cabinet by manipulating the positions and placement of the cookware or utensils as well as ease the job of storage and retrieval. Since the Detachable hanging assembly for cookware (56) utilizes a Cabinet shelf (50) for support it is possible to also use the shelf for added storage while also utilizing the cookware hanger.

Cookware guard assemblies (84) may also are coupled to the Hanger assembly rod (78) and can be positioned along the Rod (78) in between Cookware hanger assemblies (60) in order to separate the Cookware (82) hanging from adjacent Assemblies (60). Cookware guard assemblies (84) have Guard strands (88) that are made of a flexible and durable material that cannot harm the fragile Teflon coating on cookware (82). Guard strand weights (96) may be attached to the bottom end portion of Guard strands (88) such that they impose a downward force via gravity to better maintain the Cookware guard assemblies (84) initial shape. The Guard assemblies (84) prevent the cookware (82) from contacting one another and thus prevents damage to the Cookware (82) caused by metal to Teflon contact. The flexible nature of the Guards (84) allow for vertical nesting of the cookware without risk of damage to the Teflon coating of the cookware thus allowing for maximizing the utilization of the area the Assembly (56) has to store cookware.

The invention claimed is:

1. A cookware hanging assembly able to be installed inside of a kitchen cabinet without the necessity of tools comprising:
    two assembly hanging brackets, each said bracket is mounted onto an opposing end of a shelf mounted inside of a cabinet whereby the top surface of said shelf supports the weight of said brackets and whereby each said bracket occupies a volume between said cabinet and said shelf, each of said assembly hanging brackets have a rod cradle configured to be coupled to an opposing end of a hanging rod;
    said hanging rod is constructed from a rigid material and consists of an elongated rod having a continuous circumference about a longitudinal axis;
    at least one hanger assembly comprising of:
    a hanger slider configured to slidably couple to and encircle the circumference of said hanging rod;
    said hanger slider contains and supports a rotating pivot whereby said rotating pivot is able to pivot and rotate a predetermined number of degrees from the vertical axis of said rotating pivot;
    said rotating pivot is attached to a hanger hook configured to hold accommodating articles in a downward pendant position.

2. The assembly from claim 1 further including:
    at least one hanging guard assembly comprising of:
    a guard slider configured to slidably couple to and encircle the circumference of said hanging rod;
    a guard assembly attached to said guard slider, said guard assembly hangs in a downward pendant position whereby said guard assembly provides a protective barrier between articles hanging in a downward pendant position from said at least one hanger assembly positioned adjacent thereto.

3. A cookware hanging assembly able to be installed inside of a kitchen cabinet without the necessity of tools comprising:
    two assembly hanging brackets, each said bracket is mounted onto an opposing end of a shelf mounted inside of a cabinet whereby the top surface of said shelf supports the weight of said brackets and whereby each said bracket occupies a volume between said cabinet and said shelf, each of said assembly hanging brackets have a rod cradle configured to be coupled to either an opposing end of a hanging rod or to an adjustment screw;
    said hanging rod is constructed from a rigid material and consists of an elongated hollow rod having a continuous circumference about a longitudinal axis, said opposing end of said hanging rod is configured to be rotatably coupled to at least one of said rod cradles, said hanging rod has a bushing internally joined at an opposite end, said bushing has threads configured to be coupled to said adjustment screw;
    said adjustment screw is configured to be coupled to the other of said rod cradles, whereby the combined length of said adjustment screw and hanging rod is adjustable by rotating said hanging rod;
    at least one hanger assembly comprising of:
    a hanger slider configured to slidably couple to and encircle the circumference of said hanging rod;
    said hanger slider contains and supports a rotating pivot whereby said rotating pivot is able to pivot and rotate a predetermined number of degrees from the vertical axis of said rotating pivot;
    said rotating pivot is attached to a hanger hook configured to hold accommodating articles in a downward pendant position.

4. The assembly from claim 3 further including:
    at least one hanging guard assembly comprising of:
    a guard slider configured to slidably couple to and encircle the circumference of said hanging rod;
    a guard assembly attached to said guard slider, said guard assembly hangs in a downward pendant position whereby said guard assembly provides a protective barrier between articles hanging in a downward pendant position from said at least one hanger assembly positioned adjacent thereto.

5. The assembly from claim 1, wherein said rigid material is steel.

6. The assembly from claim 3, wherein said rigid material is steel.

* * * * *